United States Patent
Kim et al.

(10) Patent No.: US 7,236,850 B2
(45) Date of Patent: Jun. 26, 2007

(54) WORKING ROBOT, ACTUATOR AND CONTROL METHOD THEREOF

(75) Inventors: Mun-Sang Kim, Seoul (KR); Sung-Chul Kang, Gyeonggi-Do (KR); Chang-Hyun Cho, Seoul (KR); Hyun-Oh Shin, Ulsan (KR); Jea-Sun Kim, Chungcheongnam-Do (KR); Yo-Ha Hwang, Seoul (KR)

(73) Assignee: Korea Institute of Science and Technology (KR)

( * ) Notice: Subject to any disclaimer, the term of this patent is extended or adjusted under 35 U.S.C. 154(b) by 0 days.

(21) Appl. No.: 10/504,369

(22) PCT Filed: Apr. 18, 2002

(86) PCT No.: PCT/KR02/00710

§ 371 (c)(1),
(2), (4) Date: Jun. 22, 2005

(87) PCT Pub. No.: WO03/072315

PCT Pub. Date: Sep. 4, 2003

(65) Prior Publication Data

US 2006/0111810 A1  May 25, 2006

(30) Foreign Application Priority Data

Feb. 16, 2002  (KR) ................. 2002-8321

(51) Int. Cl.
*G06F 19/00* (2006.01)
(52) U.S. Cl. ............. 700/186; 700/245; 318/560; 901/31
(58) Field of Classification Search ............. 700/186, 700/245, 213; 318/560, 568.1–568.25; 901/31, 901/7, 8, 9, 10; 219/124.1–125.5
See application file for complete search history.

(56) References Cited

U.S. PATENT DOCUMENTS 5,272,423 A * 12/1993 Kim ............... 318/560

(Continued)

FOREIGN PATENT DOCUMENTS

JP  01 274 218  11/1989

(Continued)

OTHER PUBLICATIONS

Visual Tracking Manipulator with Redundancy and its Application to Robotic Wheel Assembly—Chang-hyun Cho et al.
International Search Report dated Nov. 13, 2002.

*Primary Examiner*—Kidest Baahta
(74) *Attorney, Agent, or Firm*—Ostrolenk, Faber, Gerb & Soffen, LLP

(57) ABSTRACT

A working robot, which is able to perform a required operation by locating a tool on a working position of a moving object, comprises a robot body moving with the object according to the movement of the object with more than one degree of freedom; an actuator mounted on a free end of the robot body and including a tool mounting unit, on which the tool is mounted, connected by a passive joint which reacts passively to small displacement of the object for locating the tool on the working position; and a control device for controlling the robot body, the actuator, and the tool.

20 Claims, 4 Drawing Sheets

U.S. PATENT DOCUMENTS 5,351,773 A * 10/1994 Yanagisawa ................ 180/8.5
5,838,882 A * 11/1998 Gan et al. .................. 700/259
2001/0055525 A1 * 12/2001 Inokuchi et al. ............ 414/800

FOREIGN PATENT DOCUMENTS

| JP | 02 212 086 | 8/1990 |
| JP | 05 143 150 | 6/1993 |
| JP | 06 270 060 | 9/1994 |

* cited by examiner

WORKING ROBOT, ACTUATOR AND CONTROL METHOD THEREOF

TECHNICAL FIELD

The present invention relates to a working robot, and more particularly, to a working robot that is able to perform a required operation by locating a tool on a working position of a moving object.

BACKGROUND ART

In general, an industrial robot, as a kind of robot is a machine performing works in a working field instead of a human being. The robot can replace men's works in bad fields by abnormal temperature, humidity, and noise and in dangerous fields such as a nuclear power plant or a coal mine.

The industrial robot is applied in various fields such as a semiconductor device fabricating process or an automated system. Especially, the industrial robot is used to increase productivity even in an automobile fabricating process, in which the industrial robot performs a required operation by moving an object of working by a conveyor or etc.

In performing the operations required to the moving object of working, the industrial robot has functions such as synchronization with the conveyor, vision detection, and tracking functions.

Said functions are used in a low operation frequency so as to enhance a stability of a system. At this time, in case of a robot having high output, large torque is required at the time of tracking the object of working and its operational performance is degraded by its own mass or inertia of moment of the mass.

Accordingly, since the above functions cannot rapidly respond to a field situation having a high frequency such as rapid change, the above functions are limited mainly to an object of working having a low frequency that moves with a constant velocity.

To solve the problems, a robot having a redundant degree of freedom is being developed to enhance an operation frequency of a robot. A 1+6 robot developed in the Ford Company is devised and tested to perform work such as an assembly for the moving object of working by attaching the robot having 6 degrees of freedom to a linear movement device having one degree of freedom.

That is, the assembly operation for the moving object was performed by attaching the robot to the linear movement device of one degree of freedom. However, since the additional linear movement device of one degree of freedom has to be moved by adjusting the robot to a conveyor, a lot of driving forces are required and a responsive performance of a system is degraded.

DISCLOSURE OF THE INVENTION

Therefore, it is an object of the present invention to provide a working robot which can perform an automatic operation for an object of working which moves at irregular velocity, capable of rapidly responding to a change having a high frequency, and being controlled without an additional modification of a control system of the conventional industrial robot.

To achieve these objects, there is provided a working robot comprising: a robot body which moves with more than one degree of freedom; an actuator mounted on a free end of the robot body and having a tool mounting unit on which a tool is mounted for locating the tool to a working position with one degree of freedom; and a control device for controlling the robot body, the actuator, and the tool.

To achieve these objects, there is also provided an actuator for a working robot comprising: a frame mounted at a free end of the working robot; a tool mounting unit installed at the frame for mounting a tool for working; and a linear driving device on which the tool mounting unit is mounted for linearly moving the tool mounting unit; and a control device.

To achieve these objects, there is also provided a control method for a working robot, wherein a velocity of a robot body is controlled by being synchronized with a moving velocity of an object of working, an actuator is mounted on a free end of the robot body so as to locate a tool at a working position, and the tool is mounted at the actuator to control a location of the tool.

MODE FOR CARRYING OUT THE PREFERRED EMBODIMENTS

Figure 1:
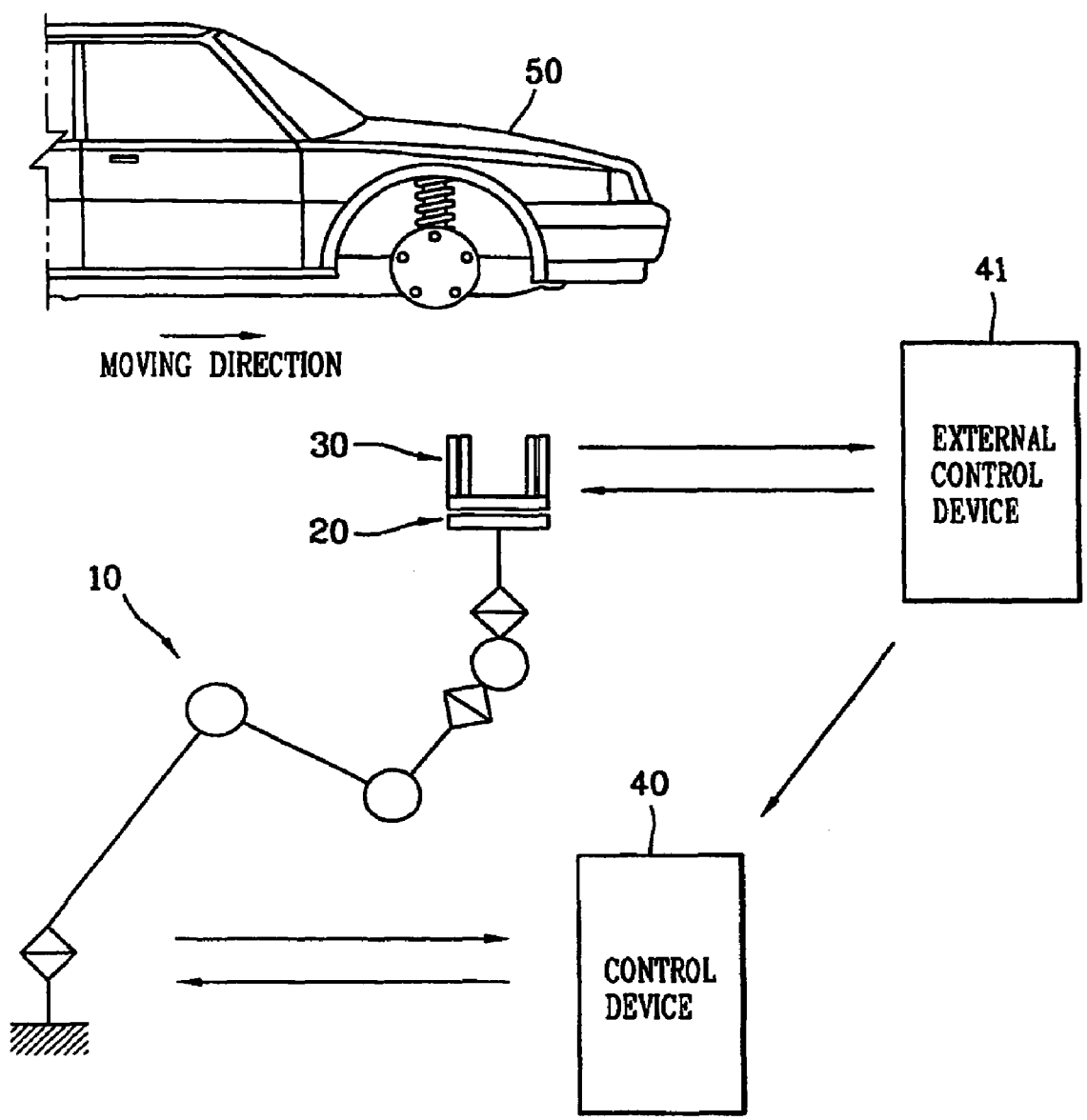
FIG. 1 is a conceptual view of a working robot according to one preferred embodiment of the present invention.
Figure 2:
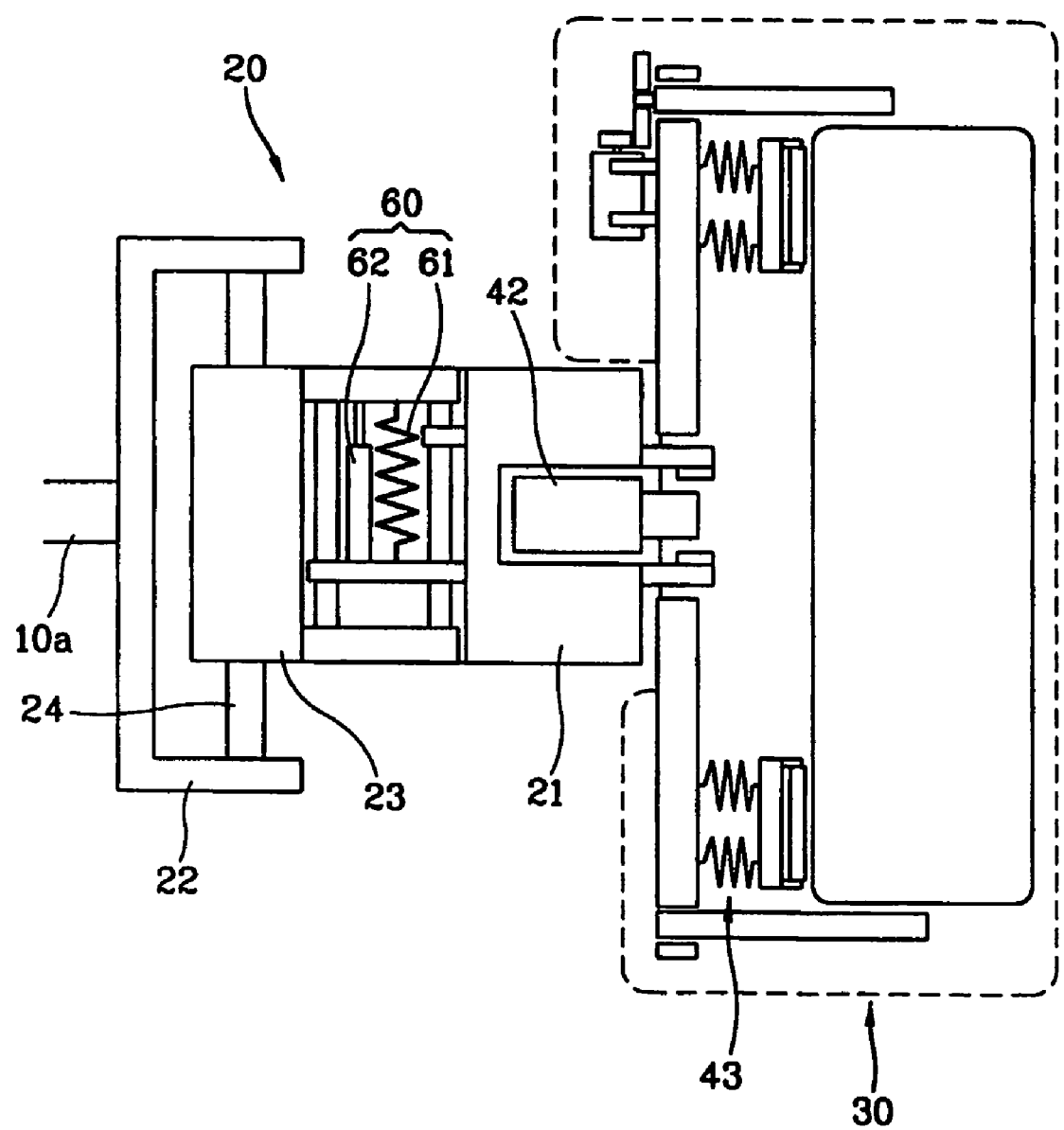
FIG. 2 is a schematic view showing an actuator and a tool of the working robot according to one preferred embodiment of the present invention.

FIG. 1 is a conceptual view of the working robot according to one preferred embodiment of the present invention, and FIG. 2 is a schematic view showing the actuator and the tool among the working robot according to one preferred embodiment of the present invention.

As shown in FIG. 1, the working robot according to one preferred embodiment comprises: a robot body 10 which moves with six degrees of freedom; an actuator 20 mounted on a free end 10a of the robot body 10, having a tool mounting unit 21 for an operation on which a tool 30 is mounted, and constructed to be consistent with a displacement form and direction of an object of working 50 so as to enhance a responsive velocity of a system, the actuator 20 for locating the tool 30 to a working position of the object of working 50; and a control device 40 for controlling the robot body 10, the actuator 20, and the tool 30.

As shown in FIG. 1, the robot body 10 of the working robot according to the one preferred embodiment for which the conventional industrial robot can be used linearly moves toward the same direction with that of a conveyor which transports the object of working 50.

Also, even if the robot body 10 has six degrees of freedom in the one preferred embodiment of the present invention, it is also possible to have degree of freedom less than six degrees. Also, a moving velocity of the robot body 10 is synchronized-controlled by the control device 40 based on a moving velocity of the object of working 50.

The actuator 20 is attached to the robot body 10 to be consistent with a form and a direction of a movement displacement of the object of working 50 (a rotational movement or a linear movement, etc.) so as to maximize an operation speed of the robot and to enhance a responsive speed of the robot. At this time, as shown in FIG. 2, the actuator 20 includes a frame 22 mounted on the free end 10a of the working robot; a tool mounting unit 21 installed at the frame 22 for mounting the tool 30 for working; and a linear driving device 23 on which the tool mounting unit 21 is mounted for linearly moving the tool mounting unit 21. Also, the actuator 20 can be operated with more than one degree of freedom.

The linear driving device 23 linearly moves along a guide 24 installed at the frame 22, in which the actuator 20 linearly moves the tool 30 by linearly moving the tool mounting unit 21. However, the actuator 20 can perform a rotational motion according to required works of the robot so as to rotate the tool 30 for an operation. That is, if necessary, a rotational device instead of the linear moving device can be mounted.

The tool mounting unit 21 is connectedly mounted on the linear driving device 23 by a passive joint 60 which respond to a minute displacement generated by a contact between the tool 30 and the object of working 50. The passive joint 60 responds to the small displacement by including a spring corresponding to an elastic member for restoring a location of the tool and a damper 62 corresponding to a damping member for absorbing shocks when the tool 30 is in contact with the object of working 50. By the passive joint 60, the working robot not only attenuates shocks generated when the tool 30 is in contact with the object of working 50 but also properly responds to the small displacement. Also, the passive joint 60 can measure a location of the tool 30 with force or torque applied thereto by measuring its displacement.

The control device 40 controls the robot body 10, the tool 30, and the actuator 20. Especially, in case that the actuator 20 having constructions according to the present invention is mounted on the free end of the conventional robot, the control device 40 is newly constructed so as to control the actuator 20 or an additional external control device 41 can be used. In case of using the additional external control device 41, there is an advantage that the conventional industrial robot can be used as it is without additional modification of the control system.

In the meantime, in order to more efficiently control the working robot when the working robot performs works required for the object of working 50, a location detecting sensor for detecting a velocity, a location of the working robot, and a location of the tool 30 is required.

Accordingly, the working robot according to one preferred embodiment of the present invention may further include a camera 42 and a force/torque sensor 43 as a location detecting sensor to detect a working location of the tool 30. The reason why the camera 42 and the force/torque sensor 43 are used is that it is difficult to identify the object of working 50 with just the camera 42 in accordance with that the tool 30 approaches to the object of working 50 and a more rapid control is required due to danger of a relative movement. Accordingly, when the tool 30 approaches to a certain distance of the object of working 50, the location detecting sensor is changed from the camera 42 to the force/torque sensor 43.

Operations of the present invention having aforementioned constructions will be explained with attached drawings in more detail.

Figure 3:
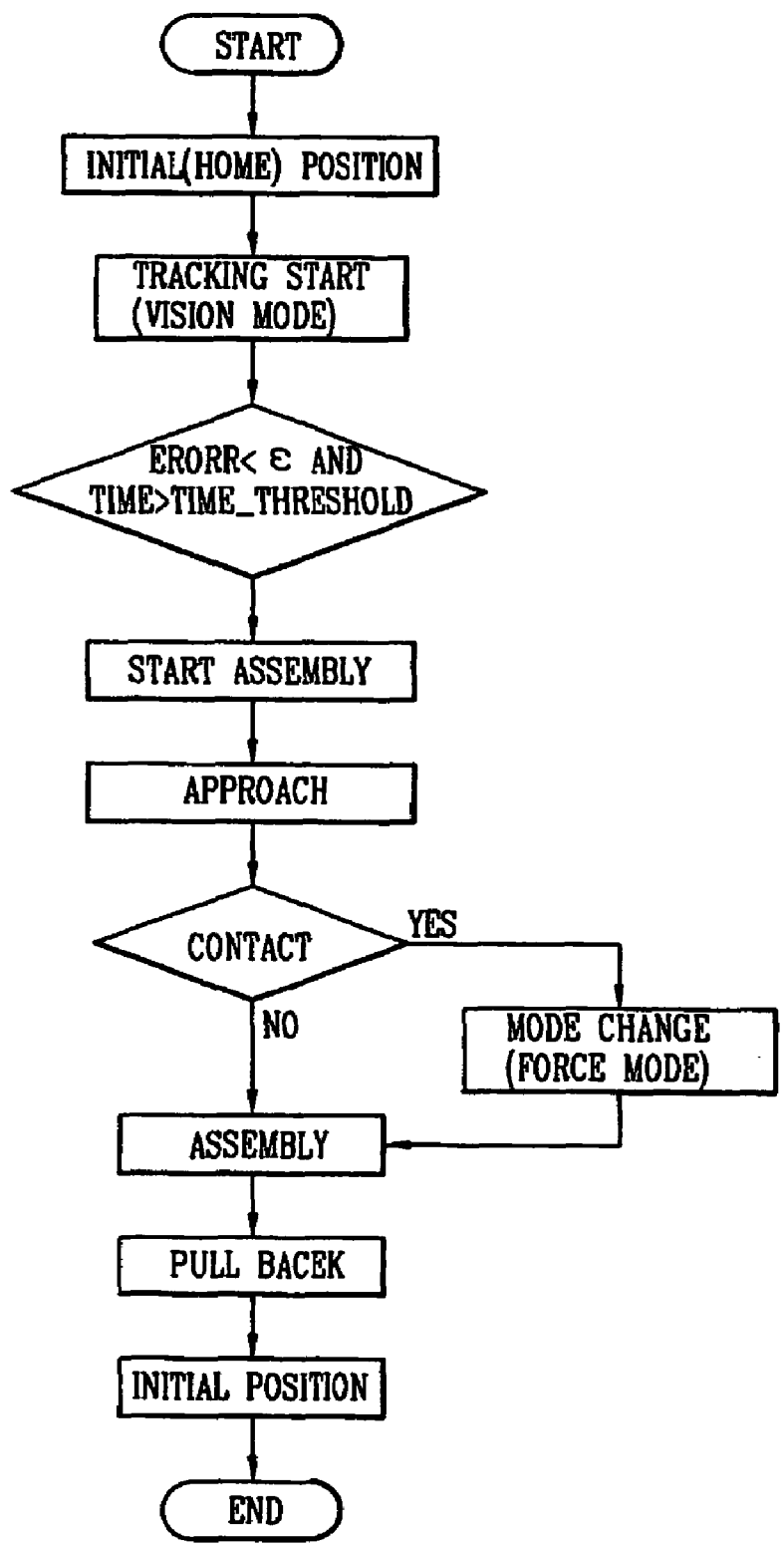
FIG. 3 is a flow chart showing a control of the working robot according to one preferred embodiment of the present invention.
Figure 4:
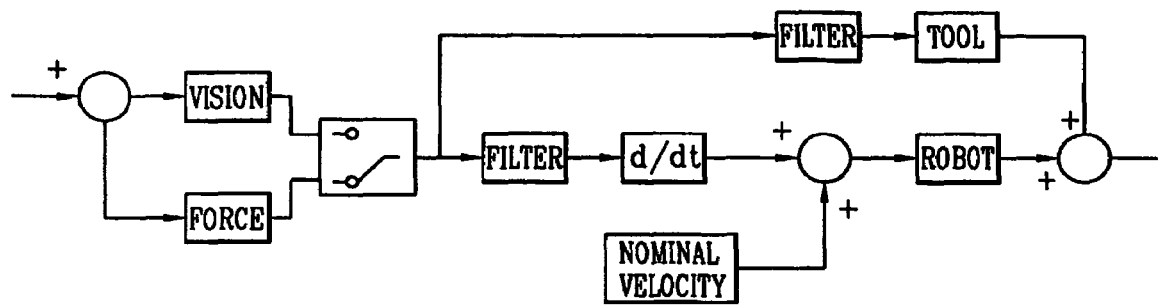
FIG. 4 is a block diagram for a control of the working robot according to one preferred embodiment of the present invention.

FIG. 3 is a flow chart showing a control for the working robot according to one preferred embodiment of the present invention, and is FIG. 4 is a block diagram according to a control for the working robot according to one preferred embodiment of the present invention.

The object of working 50 moves with a constant velocity by a conveyor, etc. as in an automobile production line. The working robot arranged at each of the operation sections performs required works in accordance with a moving velocity of the object of working 50, for example, an attachment of a tire.

A control of the working robot according to one preferred embodiment of the present invention is divided into two as expressed in the following equation 1.

$$\dot{q}_d = \dot{q}_t + \dot{q}_p \qquad \text{Equation 1}$$

wherein, the $\dot{q}_d$ denotes a required joint velocity with factors having the number corresponding to the number of degrees of freedom of the robot body 50 added by the number of degrees of freedom of the actuator 20, that is, a velocity object value of all the operable joints, $\dot{q}_t$ denotes a required velocity of each joint necessary at the time of tracking so as to transfer the tool to a target position, and $\dot{q}_p$ denotes a preset velocity of the joint for a preset operation. That is, the control for the working robot is divided into a control for tracking a moving object of working, and a control for locating the tool at a working position.

As shown in FIG. 3, the robot performs an operation according to a control flow chart. Also, the working robot according to the present invention compensates a tracking error of the object of working real time with the operation flow, thereby accomplishing a preset operation. Accordingly, a response speed for the small dislocation of the working robot can be enhanced.

The working robot according to the preferred embodiments of the present invention starts an operation in an initial state by an operation start signal. The working robot moves by synchronizing a moving velocity of the robot body 10 having 6 degrees of freedom located at an initial position with a moving velocity of the object of working 50 by a control of the control device 40 according to the operation start signal. Also, the actuator 20 mounted at the free end 10a of the robot body 10 moves the tool 30 for an operation to the working position of the object of working 50.

At this time, a location of the tool 30 is detected by the camera 42. However, as the tool 30 approaches to the object of working 50, it is difficult to identify the object of working 50. Accordingly, when a distance between the tool 30 and the object of working 50 is less than a preset value, the function of the location detection sensor for detecting the location of the tool 30 is converted to the force/torque sensor 43 from the camera 42. The force/torque sensor 43 measures a location of the tool 30 from a force value or a torque value generated by a contact with the object of working 50.

The location of the tool 30 detected from the location detection sensor is used to control a location of the actuator 10 as well as to control a velocity of the robot body 10.

Also, in case that the tool 30 performs an operation by being contacted with the object of working 50, a small displacement may be generated by a change of an external situation, etc. By the passive joint 60, the small displacement is detected and shocks due to the small displacement are buffered.

In the meantime, in controlling the working robot having the above constructions, the working robot and the actuator 20 mounted thereto are controlled by using the control device 40 for a control of the robot body 10 and the external control device 41 for a control of the actuator 20.

Especially, in case that the actuator 20 having the constructions shown in the present invention is mounted to the conventional industrial robot, the actuator 20 is controlled by using the additional external control device 41 or by connecting with an external side provided from most control devices of the industrial robot without reconstructing a control device for controlling the industrial robot.

Also, the control flow chart and the block diagram for controlling the working robot according to preferred embodiments of the present invention are illustrated in FIGS. 3 and 4.

As shown in FIGS. 3 and 4, a moving velocity of the object of working 50 and that of the robot body 10 are synchronized, and a location of the tool 30 is controlled to the working position of the object of working 50 by using the actuator 20.

The working robot according to the present invention can perform an auto assembly operation for the object of working which moves by being arranged in an assembly line of an auto assembly system, and can sensitively respond to field situations having the small displacement changed with a high frequency.

Also, the auto assembly operation for the moving object of working can be performed by using the conventional industrial robot without a change or a replacement by using the actuator according to the present invention, thereby reducing a cost.

It will be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

INDUSTRIAL APPLICABILITY

The invention claimed is:

1. A working robot comprising:
   a robot body for tracking a moving object of working;
   an actuator mounted on a free end of the robot body according to a displacement form and direction of said moving object of working and having a tool mounting unit on which a tool may be mounted, said actuator moving the tool mounting unit according to a displacement form and direction of said moving object of working so as to minimize a tracking error of the robot body; and
   a control device for controlling the robot body, the actuator, and the tool.

2. The working robot of claim 1, wherein the actuator includes:
   a frame mounted at the free end of the robot body; and
   a driving device on which the tool mounting unit is mounted, said driving device being installed at the frame according to a displacement form and direction of said moving object of working.

3. The working robot of claim 2, wherein the actuator includes the frame in which a guide for driving the driving device is installed.

4. The working robot of claim 1, further comprising a location detection means for detecting a working position of the tool so as to control a working position of the tool.

5. The working robot of claim 4, wherein the location detection means detects a location of the tool by a camera, and when a distance from the object of working is less than a predetermined value, the location of the tool is detected by an external load detected by the passive joint.

6. The working robot of claim 1, wherein a velocity of the robot body is controlled by being synchronized with a moving velocity of the working object, and a location of the actuator is controlled so as to locate the tool.

7. The working robot of claim 1, wherein the tool mounting unit is connectedly mounted by a passive joint which passively responds to a small displacement generated by the working object.

8. The working robot of claim 7, wherein the passive joint responds to the small displacement by including an elastic member and a damping member for restoring a location of the tool and absorbing shocks when the tool is in contact with the working object.

9. The working robot of claim 8, wherein the passive joint is fixed to the driving device and includes:
   a frame having a guide along which the tool mounting unit moves; and
   an elastic member and a damping member for restoring a location of the tool mounting unit and absorbing shocks of the tool mounting unit.

10. An actuator for a working robot comprising:
    a frame mounted at a free end of a working robot which tracks a moving object of working;
    a tool mounting unit installed at the frame according to a displacement form and direction of said moving object of working for mounting a tool for an operation; and
    a driving device on which the tool mounting unit is mounted for moving the tool mounting unit, said driving device being installed according to a displacement form and direction of said moving object of working.

11. The actuator of claim 10, wherein the actuator includes the frame in which a guide for moving the driving device is installed.

12. The actuator of claim 10, wherein the tool mounting unit is connectedly installed by a passive joint which passively responds to a small displacement from the object of working.

13. The actuator of claim 12, wherein the passive joint responds to the small displacement by including an elastic member and a damping member for restoring a location of the tool and absorbing shocks when the tool is in contact with the object of working.

14. The actuator of claim 12, wherein the passive joint is fixed to the driving device and includes:
    a frame having a guide along which the tool mounting unit moves; and
    an elastic member and a damping member for restoring a location of the tool mounting unit and absorbing shocks of the tool mounting unit.

15. The actuator of claim 10, further comprising a location detection means for detecting a working position of the tool so as to control a working position of the tool.

16. The working robot of claim 15, wherein the location detection means detects a location of the tool by a camera and when a distance from the object of working is less than a predetermined value, the location of the tool is detected by an external load detected by the passive joint.

17. A method for controlling a working robot, wherein a velocity of a robot body is controlled by being synchronized with a moving velocity of a moving object of working, an actuator including a tool mounting unit is mounted at a free end of the robot body according to a displacement form and direction of said moving object of working, the actuator is controlled so that the tool mounting unit is located according to a displacement form and direction of said moving object of working so as to minimize a tracking error of the robot body, and the robot body and the actuator are moved simultaneously.

18. The method of claim 17, wherein a location of the tool is detected by a camera and when the tool approaches to a constant distance of the object of working, the location of the tool is detected by a small displacement applied to the tool by the object of working, thereby controlling a location of the tool.

19. The method of claim 17, wherein the location of the tool changes in accordance with a small displacement generated by a contact between the tool and the object of working.

20. The method of claim 17, wherein an elastic member and a damping member are used to restore the location of the tool and absorb shocks generated at the time when the tool is in contact with the object of working.

* * * * *